United States Patent Office 2,958,628
Patented Nov. 1, 1960

2,958,628

HEAT TREATABLE PLASMA PROTEIN PRODUCT AND METHOD OF PREPARATION

John H. Hink, Jr., Berkeley, Calif., assignor to Cutter Laboratories, Berkeley, Calif., a corporation of California No Drawing. Filed Feb. 21, 1957, Ser. No. 641,484

5 Claims. (Cl. 167—74)

This invention in general relates to blood fractions, and more particularly to an economical method of obtaining a unique mixture of albumin, alpha globulin and beta globulin, wherein the globulin content of the mixture is of uniform molecular weight and substantially equal to the molecular weight of the albumin.

The need for a heat pasteurizable, osmotically active plasma fraction has been recognized since the discovery that pooled normal human plasma had a rather high rate of infection with the virus of homologous serum jaundice.

Such a fraction has been available for a number of years under the designation Normal Human Serum Albumin, U.S.P. This product was made possible by the work of Cohn, et al., his method of production being described in U.S. Patents No. 2,390,074 and 2,469,193 and in the J. Am. Chem. Soc. 68, 469 (1946). The method of almost universal choice for large scale fractionation for the last ten years is the so-called Method 6 described on pages 470 et. seq., of the latter reference.

In 1955 Gerlough (U.S. Patent No. 2,710,293) described a modification of Cohn's method which calls for the use of 95% alcohol rather than Cohn's 53.3%. This results in a reduction of the volumes of solutions handled and centrifuged. This method reportedly results in an increased capacity (for the same equipment) of 51 to 77%. A second Gerlough patent, No. 2,710,294, describes a method which further reduces the volumes to be handled, provided only the albumin fraction is being recovered. However, if both the gamma globulin and albumin fractions are to be recovered, the volumes handled are the same.

Mulford (J. Clin. Invest. 34, 983–986 (1955)) described a method for obtaining what he calls Stable Human Plasma Protein Solution. He simply follows Cohn's original method to the step of precipitating the gamma globulin and the β-lipoprotein fractions (Fraction II+III). The supernatant of this precipitation step is then freeze-dried. The resultant product is a mixture of Fractions IV–1, IV–4 and V. The salt content of this mixture was so high that when it was reconstituted the highest protein content which could be achieved without hypertonicity was 3%, a concentration so low as to greatly reduce the usefulness of the end product. The preparation as described has other drawbacks. It is known that Fraction IV–1 is unstable to long storage, and that further it includes all "Depressor Substance" which was present in plasma fractions. While the role of "Depressor Substance" is not clearly known in human physiology, it is not thought advisable to include in products for human use, substances which, when injected into cats, cause an immediate and dramatic fall in blood pressure. If for no other reason, the presence of such substances could mask the presence of undesirable depressor substances during the animal testing which must be carried on prior to the release of the material for human use.

Further analysis of Mulford's publication indicates that during his heating step a certain amount of protein polymerization must have occurred as shown by the presence of a fast-moving component during the ultracentrifuge analysis of the product. Such unnaturally large protein molecules are considered objectionable in products which are to be injected into humans because of the probability of causing antigenic reactions upon repeat injections.

Nitschmann (Helv. Chim. Acta. 37, 866 (1954)) has published a simplified method of obtaining human albumin and gamma globulin as separate fractions from blood plasma. Essentially his method is based on Cohn's Method 10 (J. Am. Chem. Soc. 72, 465 (1950)) which was proposed by Cohn as being valuable for roughly determining the amount of certain proteins in small amounts of plasma but has had no use as a method for preparing clinical material. While Nitschmann's method does somewhat increase the amount of protein recoverable as so-called albumin, it is estimated that at least 5 times the freeze-drying capacity required by the Cohn method is required to achieve this improvement. Further, his method of recovering gamma globulin is such that the product could not pass the requirements of the National Institutes of Health for certification in this country. Only pure gamma globulin prepared by Cohn's Method 9 is recognized by the NIH as being free of the virus of homologous serum jaundice.

A second method described by Nitschmann (Helv. Chim. Acta. 37, 1767–1778 (1954)) produces a heat treatable end-product containing glucose. The glucose causes stability problems and excessive darkening of the solution on standing. In addition to other obvious disadvantages this method is economically impractical inasmuch as both the fibrinogen and the gamma globulin are removed in a manner which renders their recovery impossible.

A modification of the above method was described by J. A. Grifolds of Spain in a paper presented at the 6th Congress of the International Society of Blood Transfusion in Boston, Massachusetts, September 4, 1956. This method is also economically impractical in that the gamma globulin and fibrinogen are denatured and destroyed in the course of processing.

One other method of obtaining heat treatable plasma proteins merits consideration. It was first disclosed by Cohn in various unofficial, unpublished communications. It has later been detailed and discussed by Pennell in papers presented at several meetings, i.e. Harvard Medical School, April 24, 1953, and Washington, D.C., September 28, 1956. The zinc-iron exchange resin method there described is quite simple and requires very little centrifugation. Unfortunately, however, the resulting apparently pure gamma globulin produced has since been found to be contaminated with the virus of homologous serum jaundice and so is unusable for clinical purposes. Furthermore, when this method is practiced on a commercial scale, the resulting end-product (SPPS) has turned out to be pyrogenic.

By the methods disclosed in the prior art, approximately one-third of the albumin is lost if 'Normal Human Serum Albumin' is produced. On the other hand, when attempts have been made to enlarge the fraction designated as Heat Treatable Plasma Proteins, either other valuable plasma proteins, such as fibrinogen and gamma globulin, have been destroyed or they are recovered in an unusable form, and/or the final Heat Treatable Plasma Protein fraction has been unsatisfactory for clinical use.

More specifically then, one of the objects of this invention is the provision of an aqueous solution of low molecular weight human blood protein which is heat treatable (to destroy the jaundice virus) and is osmotically equivalent to pure human albumin on a gram for gram protein basis.

Another object of this invention is to provide a method by which the above mentioned low molecular weight protein can be produced in amounts far greater than the amount of pure albumin recoverable from the same quantity of human plasma.

A further object of this invention is to provide a method which, while resulting in the production of heat-treatable plasma proteins in increased quantity, does not interfere with the recovery of other economically and medically valuable plasma proteins such as gamma globulin and fibrinogen.

Still other valuable aspects of this invention will be obvious from the description which follows.

As can be seen from the following flow sheet and table, I have developed a method for fractionating human plasma which, while similar in some respects to the methods of Cohn and Gerlough, has certain major differences resulting in an increase in the final recovery of heat-treatable plasma proteins of approximately 38%, while in no wise interfering with the recovery of gamma globulin and fibrinogen. Further, it will be noted that the centrifuge capacity required by my method is only 40% of that required by the Cohn method, and only 70% of that required by the Gerlough method, thus materially increasing the volume of plasma which can be fractionated by the same equipment.

*Flow sheet for heat-treated plasma protein fractionation*

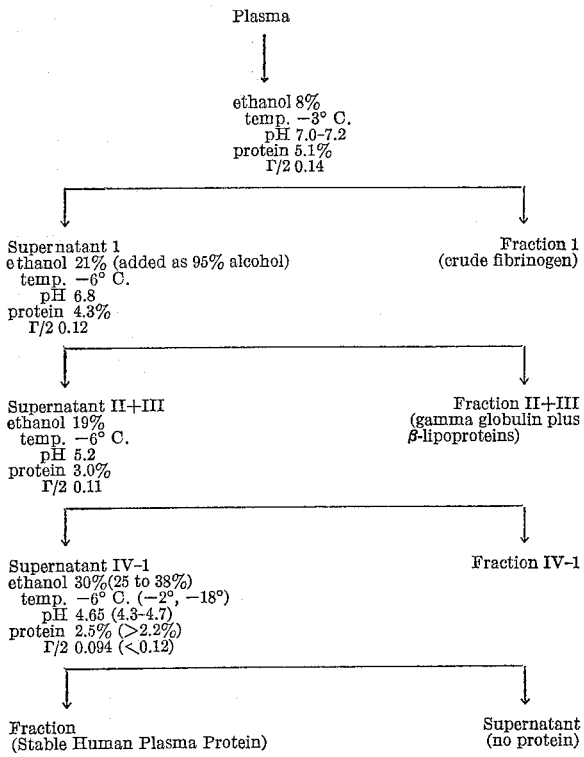

In practicing this method and by way of a quantitative example, I can start with 1000 liters plasma obtained from normal human donor blood treated with conventional anticoagulants, such as sodium citrate solution, acid-citrate-dextrose solution, Versene [1], or ion-exchange resins. All ethanol concentrations referred to are by volume (at 25° C.).

*Description of process*

(a) The amount of pH 4.0 sodium acetate-acetic acid buffer needed to adjust 1000 liters of plasma to pH 7.2 is determined. The required buffer is mixed with 176 liters of cold 53.3% ethanol and added to 1000 liters of cool plasma through jets, at a rate of not more than 450 ml./min., while gradually lowering the plasma temperature to −2.5° C. The resulting 8% ethanol-plasma mixture is centrifuged at a rate of 1500 ml./min. at −2.5° C. to remove the precipitated Fraction I. The Supernatant I recovered should be found to be in the order of 1140 liters.

(b) The amount of 10 molar acetic acid needed to adjust the 1140 liters of Supernatant I, made to 21% alcohol with 95% ethanol, to pH 6.8 is determined. The required 10 molar acetic acid, (about 900 ml.) is mixed with 201 liters of cold 95% alcohol and added to Supernatant I through jets at a rate of not more than 500 ml./min. while the Supernatant I temperature is gradually lowered to −6° C. The precipitated Fraction II+III is removed by centrifugation using a rate of 800 ml./min. per machine at −6° C. The recovered Fraction II+III is held for further processing to obtain gamma globulin. The Supernatant II+III so recovered should be in the order of 1290 liters.

(c) The amount of 10 molar acetic acid needed to adjust the 1290 liters of Supernatant II+III, made to 19% alcohol with water, to pH 5.2 is determined. The required 10 molar acetic acid, (about 5.2 liters) is brought to a volume of 140 liters with cold water and added to the Supernatant II+III through jets at a rate of 1 liter per minute. The precipitated Fraction IV-1 is allowed to settle at −6° C. for at least 6 hours and then removed by centrifugation using a rate of 400 ml./min./centrifuge.

(d) The Supernatant IV-1, being about 1380 liters, is adjusted to pH 4.6, by the addition of cold acid-alcohol mixture (2 parts 2 molar acetic acid mixed with 1 part 95% ethanol) while the Supernatant IV-1 is maintained at −6° C. The Stable Human Plasma Protein Fraction (S.H.P.F.) is precipitated by the addition of 234 liters of 95% ethanol. The ethanol is added through jets as rapidly as possible while maintaining a temperature of −6° C. The precipitate is allowed to settle at −6° C. for 36 hours. The precipitate is recovered by centrifugation, 400 ml./min. per machine, at −6° C. The final S.H.P.F. yield is about 116 kg. wet paste. After drying by conventional freeze-drying processes or by the method described in my U.S. Patent No. 2,731,731, approximately 33.5 kg. of heat-treatable plasma protein powder is obtained. More specifically the Hink patent, beginning at line 51 of column 1, states: "In the said pending Hink application, a process has been described for obviating the difficulties prevailing in the so-called freeze drying process wherein a wet precipitate of albumin is frozen solidly, the frozen precipitate is ground into relatively small particles without permitting the particles to melt, the frozen ground particles are introduced into a body of anhydrous acetone having a low temperature, the mixture is violently stirred until all of its ice content has melted and its albumin content appears as a fine granular suspension, the albumin granules are allowed to settle and the supernatant is decanted off, the resulting albumin sludge is filtered, the filter cake is repulped in anhydrous acetone; the resulting suspension is filtered to recover the granular albumin and wherein finally the granular albumin so separated is air dried or dried in any other conventional manner.

The dried powder is then reconstituted with water to a 5% protein solution, sodium acetyl tryptophanate and/or sodium caprylate is added to stabilize the proteins, sodium chloride is added to render the solution slightly less than isotonic and the solution is heated at 60° C. for 10 hours to destroy any jaundice virus. The solution can be sterilized by filtration either before or after such treatment. The pasteurized, sterile solution is described as 5% Heat-Treated Plasma Protein Fraction (H.T.P.F.).

To obtain electrophoretic analysis, a sample of the H.T.P.F. solution described above is diluted with pH 8.6 diethyl-barbiturate buffer, having an ionic strength of 0.1, to give a 1.5% protein solution. After dialysis against the buffer, the protein composition is determined in a Perkin-Elmer Model 38 Tiselius apparatus. Electropho- ---
[1] Ethylenediamine tetracetic acid.

retic patterns obtained from ten lots showed only three moving boundary peaks having mobilities of 2.7 to 3.1, 4.3 to 4.6 and 5.7 to 6.1, $\times 10^{-5}$ sq. cm. per sec. per volt respectively as measured from the initial position. These peaks indicate the presence, on the average, of 4.6% beta globulin, 8.4% alpha globulin and 87.0% albumin. The absence of moving boundary peaks with mobilities less than $2.7 \times 10^{-5}$ sq. cm. per sec. per volt indicates a complete absence of gamma globulin and fibrinogen.

Ultracentrifugal analysis of the solution is made on samples obtained by diluting the 5% H.T.P.F. solution with 0.1 molar sodium chloride to give a 1% protein solution. Using a Spinco Analytical Model Ultracentrifuge, run at 59,765 r.p.m. and mean bearing temperature of 24.46° C., sedimentation diagrams at 16, 48, 64, 80 and 96 minutes after start of run are obtained. Using ordinary magnification only one component can be detected in any of the sedimentation diagrams. Depending on the accuracy of the determinations, sedimentation constants from 3.9 to 4.2 Svedberg Units were computed for the protein component.

The results of these two analyses were totally unexpected and indicate that my product is a unique mixture of plasma proteins, which, although it comprises proteins characterized by electrophoresis as albumin, alpha globulin, and beta globulin, actually contains only those portions of alpha globulin and beta globulin which are of a uniform molecular weight similar to the molecular weight of alubumin itself. This is the first time such a substance has ever been described. This finding allows one to utilize hitherto undescribed alpha globulins and beta globulins which possess osmotic activity equal to that of alubumin.

As mentioned previously, this method of heat-treatable plasma protein production is simple and is more efficient than other procedures which recover all the commercially valuable plasma proteins in a medically usable form. The following table presents in tabular form a comparison of the volumes and yields involved.

COMPARISON OF EFFICIENCY OF VARIOUS HUMAN PLASMA FRACTIONATION METHODS

| Operation Involved | (1,000 liters of Plasma) | | | | | |
|---|---|---|---|---|---|---|
| | Method 6, Cohn | | Method 6H, Gerlough | | Method of this Invention | |
| | Cent. Vol. | Filt. Vol. | Cent. Vol. | Filt. Vol. | Cent. Vol. | Filt. Vol. |
| Fraction I | 1,180 | | 1,180 | | 1,180 | |
| Fraction II+III | 1,850 | | 1,330 | | 1,330 | |
| Fraction IV-1 | 1,900 | | 2,000 | | 1,442 | |
| Fraction IV-4 | 3,880 | 3,700 | | 1,960 | 1,682 | |
| Fraction V | 3,750 | | 1,970 | | | |
| "Pure" | 1,450 | 990 | 1,450 | 990 | | |
| Total Volume through Centrifuge | 14,010 | | 7,930 | | 5,634 | |
| Total Volume Filtered | | 4,690 | | 2,950 | | none |
| Yield of Dry Powder in Kg | 24.0 | | 24.3 | | 33.6 | |

NOTE.—Yield of fibrinogen and gamma globulin is identical for each method.

It can be seen that not only does my new method result in a significant saving in time, labor and material, but also that it results in an approximately 38% increase in usable heat-treatable plasma protein (the increased yield comprising on an average: 87.0% albumin, 8.4% alpha globulin and 4.6% beta globulin).

A 5% H.T.P.F. solution prepared in accordance with my method as described above has been tested in animals and humans and has been found to have the same capacity as a blood volume expander as a similar amount of "pure" albumin prepared by the conventional alcoholic precipitation methods. Acute and subacute toxicity studies have shown only negative results.

Human clinical studies indicate that on a volume basis my 5% H.T.P.F. solution is physiologically equivalent to a comparable volume of human plasma.

Having thus described my invention, I claim:

1. In the process of fractionating human plasma proteins by fractional precipitation with cold ethanol, after the removal of all coagulation components and all gamma globulin, the step of precipitating a mixture of albumin, alpha globulin and beta globulin at an ethanol concentration of 25 to 38%, a pH of 4.3 to 4.7, a temperature of between $-2°$ C. and the freezing point of the solution, an ionic strength of less than 0.12, and a protein concentration of greater than 2.2 percent.

2. As a new product, an aqueous solution of a low molecular weight, osmotically active, electrophoretically inhomogeneous human blood protein comprising, by electrophoretic analysis, a mixture of albumin, alpha globulin and beta globulin, and exhibiting homogenicity in the ultracentrifuge with a sedimentation constant within the range of 3.9 to 4.2 Svedberg units and wherein the amounts of said albumin, alpha globulin and beta globulin are respectively in the range of 85.92%, and 4–10% and 2.7%.

3. A product of the character set forth in claim 2 wherein said product contains a stabilizer selected from the group consisting of sodium acetyl tryptophanate and sodium caprylate.

4. An acetone-dried product of a low molecular weight, osmotically active, electrophoretically inhomogeneous human blood protein comprising, by electrophoretic analysis, a mixture of albumin, alpha globulin and beta globulin, and exhibiting homogenicity in the ultracentrifuge with a sedimentation constant within the range of 3.9 to 4.2 Svedberg units and wherein the amounts of said albumin, alpha globulin and beta globulin are respectively in the range of 85–92%, 4–10% and 2–7%.

5. An acetone-dried product such as set forth in claim 4 wherein said product contains a stabilizer selected from the group consisting of sodium acetyl tryptophanate and sodium caprylate.

References Cited in the file of this patent

UNITED STATES PATENTS 2,659,986    Hink _____ Nov. 24, 1953
2,761,808    Singher et al. _____ Sept. 4, 1956

OTHER REFERENCES

Cohn: Proc. Am. Philosophical Soc., vol. 88, September 1944, pp. 165–167.

Cohn: Chem. Reviews, vol. 28, 1941, pp. 395–417.

Inman: "The Plasma Proteins and Cellular Elements of the Blood," Pub. by Protein Foundation, Inc., Cambridge, Mass, Jan. 5–6, 1956 (10th Conf.) pp. 46–53.

Williams et al.: J. Clin. Inv., July 1944, No. 4, pp. 433–436.

Mulford: J. Clin. Inv., vol. 4, 1955, pp. 983–986.

UNITED STATES PATENT OFFICE
CERTIFICATION OF CORRECTION

Patent No. 2,958,628 November 1, 1960

John H. Hink, Jr.

It is hereby certified that error appears in the above numbered patent requiring correction and that the said Letters Patent should read as corrected below.

Column 6, line 31, for "85.92%" read -- 85-92% --; line 32, for "2.7%" read -- 2-7% --.

Signed and sealed this 25th day of April 1961.

(SEAL)
Attest:
ERNEST W. SWIDER
Attesting Officer

DAVID L. LADD
Commissioner of Patents